3,202,492
BORON COMPOUNDS AND FUELS CONTAINING THE SAME
Chien-wei Liao, Beachwood, Ohio, assignor to The Standard Oil Company, Cleveland, Ohio, a corporation of Ohio
No Drawing. Filed Oct. 18, 1961, Ser. No. 145,988
4 Claims. (Cl. 44—69)

This invention relates to novel metaborate ester-amine reaction products, their preparation, and use.

The compounds of this invention are prepared by reacting metaboric acid, or a precursor therof, with an aliphatic mono-hydroxy alcohol containing from 1 to 12 carbon atoms to form a metaborate ester and then reacting the ester with an aliphatic primary amine containing from 8 to 30 carbon atoms.

The compounds of this invention are useful as additives for hydrocarbon fuels of the gasoline boiling range since they are markedly effective in suppressing surface ignition in a spark ignited internal combustion engine. Surface ignition is a phenomenon attributed to combustion chamber deposits which accumulate during the operation of an initially clean engine, and is caused principally by such deposits becoming heated to incandescence within the combustion chambers during engine operation, and igniting the fuel either before or after that portion of the cycle where normal spark plug discharge would cause ignition. Surface ignition manifests itself in various ways characterized as "roughness," "rumble," various forms of knocking, and a general lack of smoothness in engine operation. It has been found that incorporating minor amounts of one or more of the compounds of this invention in gasoline modifies the action of the resulting fuel on an engine to provide an overall improvement in smoothness of engine operation.

It is therefore an object of this invention to prepare novel metaborate ester-amine reaction products.

It is a further object of this invention to prepare hydrocarbon fuels of the gasoline boiling range containing minor amounts of one or more of the novel metaborate ester-amine reaction products described herein.

Other objects and advantages will become apparent from the following detailed description of the invention.

The novel compounds of this invention may conveniently be prepared by (1) mixing a monohydroxy alcohol and boric oxide in a 2:1 molar ratio together with a suitable organic solvent such as benzene, and heating at reflux to azeotropically remove the water of reaction to form a benzene solution of metaborate ester; and (2) mixing the benzene solution of the ester with a primary mono-amine in a 2:1 molar ratio and heating at reflux to remove the alcohol formed in the reaction along with the remaining benzene solvent.

The metaborate ester need not be isolated nor purified since the ester formation is essentially a quantitative reaction, and the solvent does not hinder the ester-amine reaction.

To satisfy hydrocarbon solubility and/or stability requirements, the alcohol is preferably an aliphatic mono-hydroxy alcohol of from 1 to 12 carbon atoms, preferably saturated. Straight and branched chain alcohols are suitable. To satisfy these same requirements, the amine is preferably a primary aliphatic mono-amine of from 8 to 30 carbon atoms. The hydrocarbon portion of the amine may be straight or branched chain, and commercially available mixtures of amines are also suitable.

*Example I*

One mole of diisopropyl carbinol and one-half mole of boric oxide were placed in a flask and to this was added 250 mls. of benzene. The resulting mixture was heated at reflux until the water of reaction had been removed by azeotropic distillation, to form a benzene solution of diisopropyl carbinyl metaborate.

*Example II*

To a moiety of the reaction product of Example I containing 10.8 grams of diisopropyl carbinyl metaborate was added 2.5 grams (a 2:1 molar ratio) of a commercially available mixture of $C_{12}$–$C_{14}$ branched-chain primary amines (mol. wt. 191). This mixture was heated at reflux for several hours until the alcohol formed in the reaction and the benzene solvent were removed by distillation.

*Example III*

To a moiety of the reaction product of Example I containing 20 grams of diisopropyl carbinyl metaborate was added 6.18 grams (a 2:1 molar ratio) of a commercially available mixture of $C_{16}$–$C_{18}$ primary amines (mol. wt. 263). This mixture was heated at reflux for several hours until the alcohol formed in the reaction and the benzene solvent were removed by distillation.

*Example IV*

To a moiety of the reaction product of Example I containing 20 grams of diisopropyl carbinyl metaborate was added 7.4 grams (a 2:1 molar ratio) of a commercially available mixture of $C_{18}$–$C_{21}$ branched-chain primary amines (mol. wt. 269–311). This mixture was heated at reflux for several hours until the alcohol formed in the reaction and the benzene solvent was removed by distillation.

Specific examples of other alcohols which may be used in the above examples include methanol, isopropanol, 2-ethyl hexanol, hexanol, and methyl isobutyl carbinol. Specific examples of other amines that may be used are octyl amine, decyl amine, stearyl amine, oleyl amine and hexacosanyl amine.

When used as gasoline adjuvants, the metaborate ester-amine reaction products of this invention are effective in concentrations which provide as little as .002 wt. percent boron, based on the weight of gasoline. Generally, concentrations which provide more than 0.1 wt. percent boron cannot be economically justified. The theoretical upper limit for additive concentration exceeds the practical upper limit dictated by economic considerations and is therefore unimportant.

Gasoline base stocks to which these reaction products can be added include any of those conventionally used in preparing a motor fuel for a spark ignited internal combustion engine, such as catalytic distillate, motor polymer, alkylate, catalytic reformate, isomerate, naphthas, etc. The gasoline will preferably contain an antiknock agent of the tetra-alkyl lead type, such as tetraethyl lead, tetramethyl lead or chemical or physical mixtures thereof, and a scavenger agent such as ethylene dichloride and/or ethylene dibromide. The amount of anti-knock agent will usually be at a level of approximately 3 ml./gal. but may range from ½ ml./gal. up to 6 ml./gal. The gasoline may also include other conventional additives such as solvent oils, dyes, and the like.

The ability of the compounds of this invention to suppress surface ignition is demonstrated by the following test:

An ASTM–CFR single-cylinder engine having a compression ratio adjusted to 12:1 was employed in the test. Preparatory to test cycle, the engine was run open throttle at 900 r.p.m. for thirty minutes, to stabilize engine operation on the candidate fuel. Following this, the engine continued operating at open throttle, continuously, for three hours, during which time the surface ignition count was observed electronically. All test conditions were the same throughout except for the additive.

The base fuel used in each test was the same and had the following composition and specifications:

|  | Vol. percent |  | Engler, °F. |
|---|---|---|---|
| Saturates | 50.6 | IBP | 93 |
| Olefins | 5.1 | 10 | 136 |
| Aromatics | 44.4 | 30 | 195 |
|  |  | 50 | 247 |
| F$_1$ | 101.5 | 70 | 288 |
| RVP (p.s.i.) | 12.52 | 90 | 345 |
| API (° 60/60) | 52.55 | EP | 414 |
| TEL (cc./gal.) | 3.00 |  |  |

The results shown in the table below are expressed in terms of precentages of the surface ignition (SI) count for the unmodified base fuel.

| Additive | Concentration (Wt. Percent Boron) | SI Rating of Fuel (Percent base fuel) | |
|---|---|---|---|
|  |  | Total SI | Audible SI |
| None | none | 100 | 100 |
| Example II | .004 | 41.0 | 50.2 |
| Example III | .002 | 53.1 | 17.3 |
| Example IV | .004 | 38.3 | 12.7 |

It can be seen from these results that the metaborate ester-amine reaction products of this invention are very effective surface ignition suppressants.

It will be understood that various modifications of the present invention will occur to those skilled in the art upon reading the foregoing disclosure. It is intended that all such modifications be covered which reasonably fall within the scope of the appended claims.

I claim:
1. A hydrocarbon fuel of the gasoline boiling range containing a compound selected from the group consisting of compounds formed by
   (a) reacting in the appropriate molar ratio to form a metaborate ester
      (1) metaboric acid, with
      (2) a saturated, aliphatic, monohydroxy alcohol of from 1 to 12 carbon atoms, and
   (b) further reacting the metaborate ester in a 2:1 molar ratio with a member selected from the group consisting of a primary, aliphatic monoamine of from 8 to 30 carbon atoms and mixtures of such amines, said compound being present in an amount to provide from .002 to 0.1 wt. percent baron.

2. A leaded hydrocarbon fuel of the gasoline boiling range containing from 0.5 to 6 ml./gal. of a tetraalkyl lead and a compound formed by the reaction in a 2:1 molar ratio, of (a) diisopropyl carbinyl metaborate, and (b) a mixture of primary, aliphatic monoamines of from 12 to 14 carbon atoms, said compound being present in an amount to provide from .002 to 0.1 wt. percent boron.

3. A leaded hydrocarbon fuel of the gasoline boiling range containing from 0.5 to 6 ml./gal. of a tetraalkyl lead and a compound formed by the reaction in a 2:1 molar ratio of (a) diisopropyl carbinyl metaborate, and (b) a mixture of primary, aliphatic monoamines of from 16-18 carbon atoms, said compound being present in an amount to provide from .002 to 0.1 wt. percent boron.

4. A leaded hydrocarbon fuel of the gasoline boiling range containing from 0.5 to 6 ml./gal. of a tetraalkyl lead and a compound formed by the reaction in a 2:1 molar ratio, of (a) diisopropyl carbinyl metaborate, and (b) a mixture of primary, aliphatic monoamines of from 18-21 carbon atoms, said compound being present in an amount to provide from .002 to 0.1 wt. percent boron.

References Cited by the Examiner

UNITED STATES PATENTS

| 2,257,194 | 9/41 | Rosen | 44—72 |
| 2,259,175 | 10/41 | Paul | 260—808 |
| 2,629,732 | 2/53 | Schechter | 260—462 |
| 2,875,236 | 2/59 | Levens et al. | 44—69 |
| 2,927,124 | 3/60 | Olmstead et al. | 260—462 |
| 2,957,840 | 10/60 | Groszos et al. | 44—72 |
| 2,999,740 | 9/61 | Branigan | 44—69 |
| 3,030,196 | 4/62 | Dykstra | 44—69 |
| 3,122,585 | 2/64 | Schechter et al. | 44—72 |

DANIEL E. WYMAN, *Primary Examiner.*

JULIUS GREENWALD, *Examiner.*